US012779957B2

(12) United States Patent
Wang et al.

(10) Patent No.: US 12,779,957 B2

(45) Date of Patent: Nov. 3, 2026

(54) METHOD AND APPARATUS FOR CONTROLLING VARIABLE TRANSMITTANCE GLASS

(71) Applicant: Yinwang Intelligent Technologies Co., Ltd., Shenzhen (CN)

(72) Inventors: Peizhi Wang, Shanghai (CN); Yi Wang, Shanghai (CN); Minghui Zheng, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 351 days.

(21) Appl. No.: 18/417,873

(22) Filed: Jan. 19, 2024

(65) Prior Publication Data

US 2024/0157769 A1 May 16, 2024

Related U.S. Application Data

(63) Continuation of application No. PCT/CN2021/107588, filed on Jul. 21, 2021.

(51) Int. Cl.

*B60J 3/04* (2006.01)
*B60R 16/023* (2006.01)

(Continued)

(52) U.S. Cl.

CPC ................. *B60J 3/04* (2013.01); *G01S 17/89* (2013.01); *G01S 17/931* (2020.01); *G06T 7/80* (2017.01);

(Continued)

(58) Field of Classification Search

CPC .. B60J 3/04; G06T 7/80; G01S 17/931; G01S 17/89; B60Q 2800/10; B60R 16/023; B60W 2420/40

(Continued)

(56) References Cited

U.S. PATENT DOCUMENTS 5,298,732 A * 3/1994 Chen .......................... B60J 3/04 351/44
10,744,936 B1 8/2020 Budhia et al.

(Continued)

FOREIGN PATENT DOCUMENTS

CN 107270888 A 10/2017
CN 107791800 A 3/2018

(Continued)

*Primary Examiner* — Hunter B Lonsberry
*Assistant Examiner* — Helen Li
(74) *Attorney, Agent, or Firm* — Leydig, Voit & Mayer, Ltd.

(57) ABSTRACT

Embodiments of this application provide a method for controlling variable transmittance glass. The method includes: obtaining an elevation angle and a yaw angle of a light source, where the elevation angle indicates an included angle between a direction in which light of the light source is emitted to the target vehicle and a horizontal plane, and the yaw angle indicates an included angle between a connection line between a projection of the light source on the horizontal plane and a centroid of the target vehicle, and a driving direction of the target vehicle; obtaining location information of a target object; obtaining a projection area projected by the target object on the variable transmittance glass based on the location information of the target object, and the elevation angle and the yaw angle of the light source, where the target object is located in the target vehicle.

8 Claims, 7 Drawing Sheets

(51) Int. Cl.
*G01S 17/89* (2020.01)
*G01S 17/931* (2020.01)
*G06T 7/80* (2017.01)

(52) U.S. Cl.
CPC ........ *B60Q 2800/10* (2022.05); *B60R 16/023* (2013.01); *B60W 2420/40* (2013.01)

(58) Field of Classification Search
USPC .............................................................. 701/1
See application file for complete search history.

(56) References Cited

U.S. PATENT DOCUMENTS

| | | | | |
|---|---|---|---|---|
| 2007/0126255 | A1* | 6/2007 | Mitsui | B60J 3/0204 296/97.2 |
| 2016/0363993 | A1* | 12/2016 | Leng | B60J 3/04 |
| 2018/0141414 | A1* | 5/2018 | Lota | B60N 2/0035 |
| 2019/0096340 | A1 | 3/2019 | Todd et al. | |
| 2019/0118624 | A1* | 4/2019 | Chu | G02F 1/153 |
| 2020/0017023 | A1* | 1/2020 | Anderson | G01J 1/0411 |
| 2021/0318560 | A1* | 10/2021 | Kawano | G02F 1/133 |

FOREIGN PATENT DOCUMENTS

| | | | | | |
|---|---|---|---|---|---|
| CN | 110435400 | A | | 11/2019 | |
| CN | 111344169 | A | | 6/2020 | |
| DE | 212019000345 | U1 | | 2/2021 | |
| GB | 2511751 | A | * | 9/2014 | B60R 16/00 |
| JP | 2005297716 | A | | 10/2005 | |
| JP | 2009078651 | A | | 4/2009 | |
| JP | 2010143463 | A | | 7/2010 | |
| JP | 2017214761 | A | | 12/2017 | |
| KR | 20130029685 | A | | 3/2013 | |
| WO | WO-2014195821 | A1 | * | 12/2014 | G02C 11/10 |
| WO | 2020036057 | A1 | | 2/2020 | |

* cited by examiner

Vehicle 100

METHOD AND APPARATUS FOR CONTROLLING VARIABLE TRANSMITTANCE GLASS

CROSS-REFERENCE TO RELATED APPLICATIONS

This application is a continuation of International Application No. PCT/CN2021/107588, filed on Jul. 21, 2021, the disclosure of which is hereby incorporated by reference in its entirety.

TECHNICAL FIELD

This application relates to the field of vehicle control, and in particular, to a method and an apparatus for controlling variable transmittance glass.

BACKGROUND

Light pollution is attracting increasing attention from the society, especially in the transportation field. Strong light interferes with the sight of a driver, which poses great security risks. For example, a high beam of an oncoming vehicle, a common gantry illumination light on a highway, or a roadside advertising electronic screen may cause the driver to suffer glare of different degrees at night, causing a traffic accident. Similarly, sunlight on the eyes of the driver may also cause the driver to suffer glare. To resolve this problem, a conventional solution is to use a rotatable sunshade installed in front of the driver, and adjust the sunshade to block interference caused by strong light to the driver. However, a blocking range formed by rotating and adjusting the sunshade actually has difficulty in completely coping with strong light interference in different directions, and may block the sight of the driver.

In addition to the foregoing driving security risks, strong light also causes discomfort of a passenger. For example, a passenger on a front passenger seat also has glare. In particular, since a glass roof or a panoramic sunroof becomes a trend of design, sun protection is inevitable. A conventional solution for this issue is to attach a sunscreen film to glass of the glass roof or the panoramic sunroof, which though blocks sunlight, compromises spacious experience brought by the sunroof or the glass roof.

SUMMARY

For a problem of poor blocking of strong light in the conventional technology, embodiments of this application provide a technical solution of implementing light shielding by controlling variable transmittance glass.

According to a first aspect, an embodiment of this application provides a method for controlling variable transmittance glass. The variable transmittance glass is disposed on a target vehicle. The method includes: obtaining an elevation angle and a yaw angle of a light source, where the elevation angle indicates an included angle between a direction in which light of the light source is emitted to the target vehicle and a horizontal plane, and the yaw angle indicates an included angle between a connection line between a projection of the light source on the horizontal plane and a centroid of the target vehicle, and a driving direction of the target vehicle; obtaining location information of a target object; obtaining a projection area projected by the target object on the variable transmittance glass based on the location information of the target object, and the elevation angle and the yaw angle of the light source, where the target object is located in the target vehicle; and adjusting transmittance of the projection area on the variable transmittance glass.

In an embodiment, the method further includes: obtaining orientation information of the light source relative to the target vehicle.

In an embodiment, the obtaining an elevation angle and a yaw angle of a light source includes: obtaining the elevation angle and the yaw angle of the light source based on a first illuminance value and a second illuminance value. The first illuminance value is an illuminance value detected by a top illuminance sensor disposed on top of the target vehicle, and the second illuminance value includes an illuminance value detected by an illuminance sensor that is disposed on the target vehicle and that is corresponding to the orientation information.

In an embodiment, the obtaining an elevation angle and a yaw angle of a light source includes: obtaining a first elevation angle and a first yaw angle of the light source based on an image that is captured by a camera and that includes the light source and an intrinsic parameter of the camera; obtaining a second elevation angle and a second yaw angle of the light source based on a third illuminance value and a fourth illuminance value, where the third illuminance value is an illuminance value detected by a top illuminance sensor disposed on top of the target vehicle, and the fourth illuminance value includes an illuminance value detected by an illuminance sensor that is disposed on the target vehicle and that is corresponding to the orientation information; and obtaining the elevation angle and the yaw angle of the light source based on the first elevation angle, the second elevation angle, the first yaw angle, and the second yaw angle.

In an embodiment, the obtaining the elevation angle and the yaw angle of the light source based on the first elevation angle, the second elevation angle, the first yaw angle, and the second yaw angle includes: on the basis of a difference between the first elevation angle and the second elevation angle and a difference between the first yaw angle and the second yaw angle, obtaining the elevation angle of the light source based on the first elevation angle and the second elevation angle, and obtaining the yaw angle of the light source based on the first yaw angle and the second yaw angle.

In an embodiment, the obtaining orientation information of the light source relative to the target vehicle includes: obtaining the orientation information based on an illuminance value detected by an illuminance sensor disposed on the target vehicle.

In an embodiment, the obtaining a projection area projected by the target object on the variable transmittance glass based on the location information of the target object, and the elevation angle and the yaw angle of the light source includes: obtaining a mapping area of the target object on a vertical plane based on the location information of the target object, and the elevation angle and the yaw angle of the light source, where the vertical plane indicates a plane that is perpendicular to a plane on which a chassis of the target vehicle is located and that passes through an upper edge of the variable transmittance glass; and obtaining the mapping area of the target object on the variable transmittance glass based on an included angle between the vertical plane and the variable transmittance glass and the mapping area of the target object on the vertical plane.

According to a second aspect, an embodiment of this application provides an apparatus for controlling variable transmittance glass, including a processor and a memory.

The memory stores instructions, and when the instructions stored in the memory are invoked by the processor, the instructions are used to perform the method described in any one of the first aspect or the possible implementations of the first aspect.

According to a third aspect, an embodiment of this application provides a computer-readable storage medium, including a program. When the program is run on a computer, the computer is enabled to perform the method described in any one of the first aspect or the possible implementations of the first aspect.

This application provides a method for controlling variable transmittance glass, so that transmittance of some areas of variable glass can be more accurately controlled based on the elevation angle and the yaw angle of the light source, and the location information of an object that needs light shielding.

BRIEF DESCRIPTION OF DRAWINGS

To describe technical solutions in embodiments of this application more clearly, the following describes the accompanying drawings used in the embodiments of this application.

DESCRIPTION OF EMBODIMENTS

To make objectives, technical solutions, and advantages of this application clearer, the following further describes the technical solutions in embodiments of this application in detail with reference to the accompanying drawings. It is clear that the described embodiments are merely some but not all of embodiments of this application. All other embodiments obtained by a person skilled in the art based on the embodiments of this application without creative efforts shall fall within the protection scope of this application.

Figure 1:
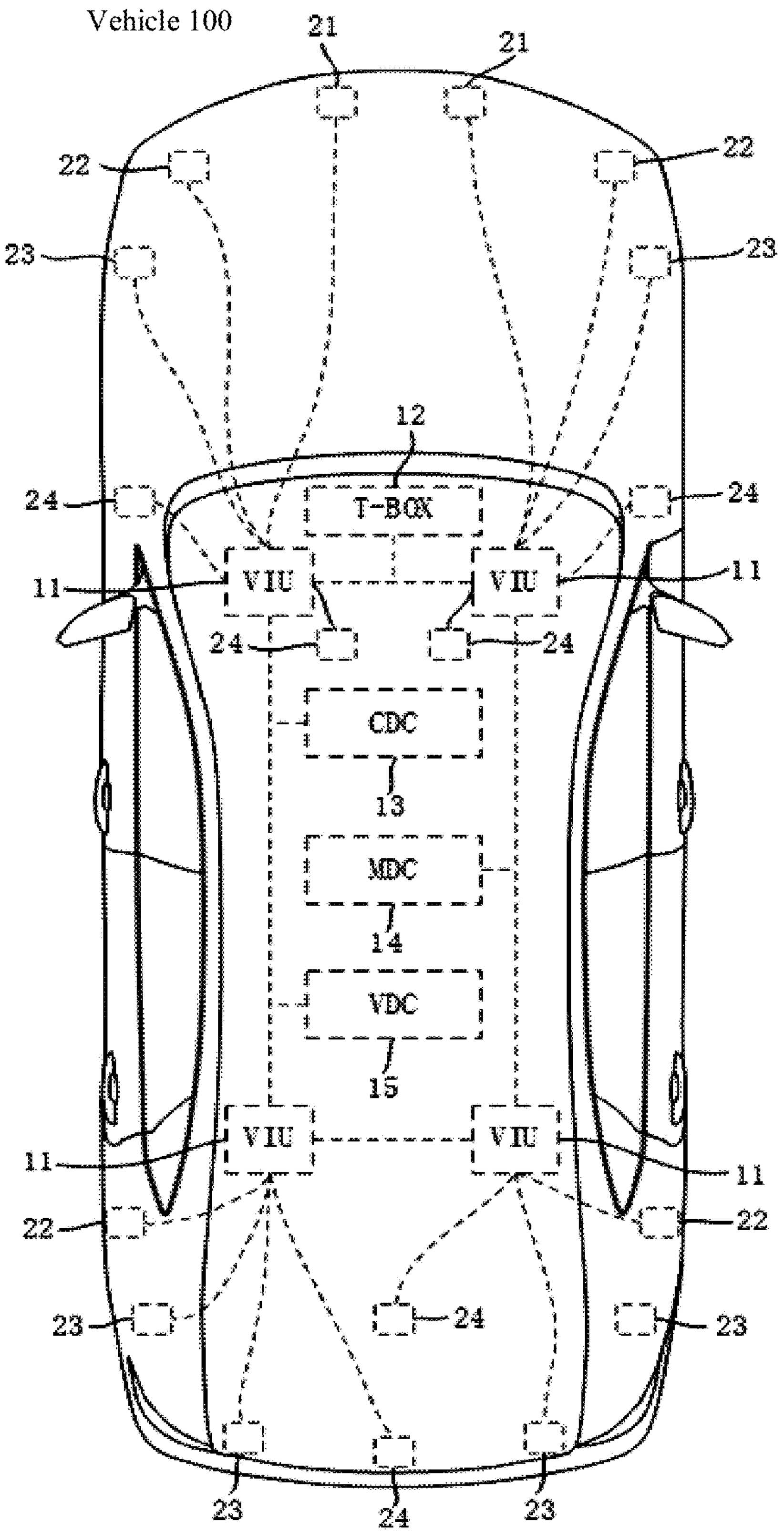
FIG. 1 is a schematic diagram of an architecture of a vehicle system according to an embodiment of this application.

FIG. 1 is a schematic diagram of a system architecture of a vehicle 100 according to an embodiment of this application. The vehicle 100 includes a plurality of vehicle integration units (VIU) 11, a telematic box (T-BOX) 12, a cockpit domain controller (CDC) 13, a mobile data center (MDC) 14, and a vehicle domain controller (VDC) 15.

The vehicle 100 further includes a plurality of types of sensors disposed on the vehicle body, including a lidar 21, a millimeter-wave radar 22, an ultrasonic radar 23, and a camera apparatus 24. Each type of sensor may include a plurality of sensors. It should be understood that although FIG. 1 shows a location layout of different sensors on the vehicle 100, a quantity and a location layout of sensors in FIG. 1 are merely examples. A person skilled in the art may properly select a type, a quantity, and a location layout of the sensor based on a requirement.

FIG. 1 shows four VIUs. It should be understood that a quantity and locations of VIUs in FIG. 1 are merely examples, and a person skilled in the art may select a proper quantity and locations of VIUs based on an actual requirement.

The vehicle integration unit VIU 11 provides a plurality of vehicle parts with some or all of data processing functions or control functions required by the vehicle components. The VIU may have one or more of the following functions.

1. Electronic control function: The VIU is configured to implement an electronic control function provided by electronic control units (ECU) inside some or all vehicle components, for example, a control function required by a vehicle component, and for another example, a data processing function required by a vehicle component.

2. Functions same as those of a gateway: The VIU may further have some or all functions same as the gateway, for example, a protocol conversion function, a protocol encapsulation and forwarding function, and a data format conversion function.

3. Processing function of data across vehicle components: Processing, calculating, and the like on data obtained from executors of a plurality of vehicle components.

It should be noted that the data involved in the foregoing functions may include running data of an executor in the vehicle component, for example, a motion parameter of the executor and a working status of the executor. Alternatively, the data involved in the foregoing functions may be data collected through a data collection unit (for example, a sensitive element) of the vehicle component, for example, road information of a road on which a vehicle travels, or weather information that are collected by the sensitive element of the vehicle. This is not specifically limited in embodiments of this application.

In the example of the vehicle 100 in FIG. 1, the vehicle 100 may be divided into a plurality of domains, and each domain has an independent domain controller. Specifically, FIG. 1 shows two types of domain controllers: the cockpit domain controller CDC 13 and the vehicle domain controller VDC 15.

The cockpit domain controller CDC 13 may be configured to implement function control of a cockpit area of the vehicle 100. Vehicle components in the cockpit area may include a head up display (HUD) apparatus, a dashboard, a radio, a central control screen, navigation, a camera, and the like.

The vehicle domain controller VDC 15 may be configured to perform coordinated control on a power battery and an engine 141 of the vehicle, to improve power performance of the vehicle 100.

FIG. 1 further shows the internet of vehicles device T-BOX 12 and the mobile data center MDC 14. The T-BOX 12 may be configured to implement communication connection between the vehicle 100 and internal and external devices of the vehicle. The T-BOX may obtain in-vehicle device data through a bus of the vehicle 100, or may be communicatively connected to a mobile phone of a user through a wireless network. The mobile data center MDC 14 is configured to output execution control instructions, for example, driving, transmission, steering, and braking based on core control algorithms, for example, environment sensing and positioning, intelligent planning and decision-making, and vehicle motion control, to implement automatic control of the vehicle 100, and can further implement human-computer interaction of vehicle driving information through a human-computer interaction interface.

The four VIUs 11 in FIG. 1 form a ring topology connection network. Each VIU 11 is communicatively connected to a sensor in a nearby location. The T-BOX 12, the CDC 13, the MDC 14, and the VDC 15 are communicatively connected to the ring topology connection network of the VIUs. The VIU 11 may obtain information from each sensor, and report the obtained information to the CDC 13, the MDC 14, and the VDC 15. Through a ring topology network, mutual communication may also be implemented between the T-BOX 12, the CDC 13, the MDC 14, and the VDC 15.

It should be understood that the ring topology network connection is merely an example, and a person skilled in the art may select another proper VIU connection manner based on a requirement.

The VIUs may be connected through, for example, Ethernet. The VIU and the T-Box 12, the CDC 13, the MDC 14, and the VDC 15 may be connected through, for example, Ethernet or a peripheral component interconnect express (PCIe) technology. The VIU and the sensor may be connected through, for example, a controller area network (CAN), a local interconnect network (LIN), FlexRay, or a media oriented system transport (MOST).

Figure 2:
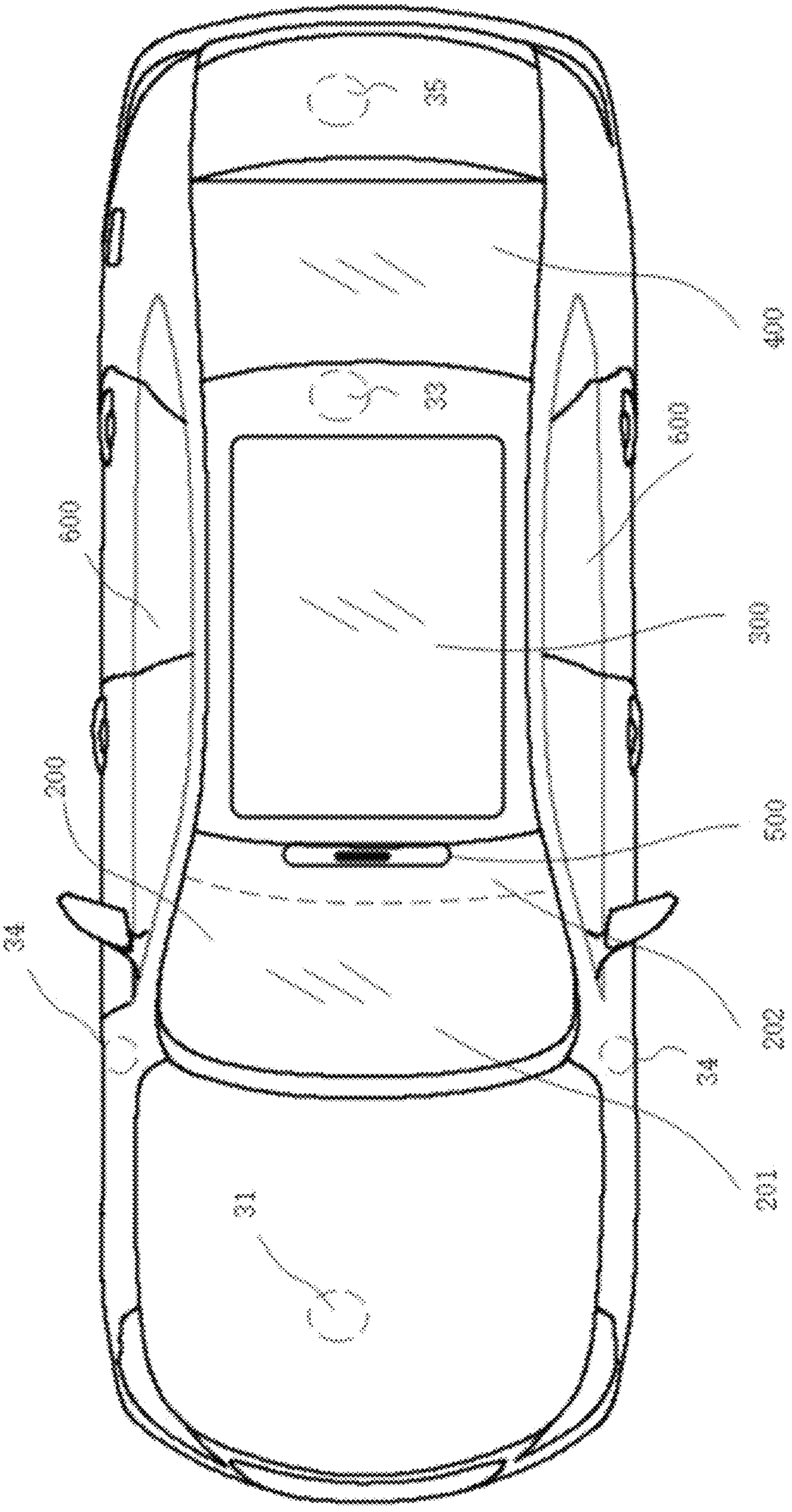
FIG. 2 is a schematic diagram of a vehicle according to an embodiment of this application.

As shown in FIG. 2, the vehicle 100 in embodiments of this application may further include illuminance sensors disposed at different positions of the vehicle: a front side illuminance sensor 31, a left side illuminance sensor 32, a top illuminance sensor 33, a right side illuminance sensor 34, and a rear side illuminance sensor 35. The illuminance sensor is configured to detect illuminance of an area in which the illuminance sensor is disposed. The illuminance is light intensity, means a luminous flux of visible light received per unit area, and may indicate intensity of light and a quantity of a degree of illumination of an object surface area. A unit of illuminance is a quantity of lumens (lm) per square meter, and the unit is lux (lux or lx), that is, 1 lux=1 lm/$m^2$. The illuminance sensor is an apparatus that converts an optical signal into an electrical signal based on a photoelectric effect. A photosensitive element of the illuminance sensor may be a photoresistor or a photodiode.

Optionally, the vehicle 100 further includes a front windshield 200, a vehicle sunroof glass 300, a rear windshield 400, a front-view camera 500, and a vehicle window glass 600. Optionally, the front windshield 200 includes at least two areas: an area 201 and an area 202. The area 201 may implement a function of a conventional front windshield of a vehicle, and a material may be, for example, tempered glass, laminated glass, and the like. The area 202 may adjust transmittance based on a control signal. An adjustable range of transmittance of the area 202 varies with a hardware parameter and a function requirement of the area 202. Optionally, the transmittance of the area 202 may be adjusted in an interval of 0% to 100%. Larger transmittance indicates better transmission. However, it is impossible for any transparent material to reach 100% transmittance, and highest transmittance is only about 95%. Two values may be set for the transmittance of the area 202. One value indicates that the area 202 is in a transparent state, and the other value indicates that the area 202 is in an opaque state. Optionally, the transmittance of the area 202 may be adjusted to a transparency degree of the area 202 same as/close to that of the area 201, that is, an obvious boundary between the area 201 and the area 202 cannot be seen visually by a person. Optionally, the area 202 may be implemented by embedding a light shield layer whose transmittance can be adjusted into a glass laminated layer of a part of areas of the front windshield 200. The light shield layer is a general term concept, and is merely for ease of expression. The light shield layer can adjust the transmittance under control of the control signal. Correspondingly, another area of the front windshield 200 is the area 201. For example, the front windshield 200 is a structure of double-layer glass. A composite of a polymer and a liquid crystal is laminated between two layers of glass in the part of areas of the front windshield, and the front windshield 200 including the area 201 and the area 202 may be obtained by using an integrated molding technology. The composite of the polymer and the liquid crystal may be referred to as the light shield layer, and an area of the front windshield to which the composite of the polymer and the liquid crystal is added between the two layers of glass is the area 202. A common component that can be used as the light shield layer includes a polymer dispersed liquid crystal (PDLC) or an inverted PDLC. Alternatively, the front windshield 200 including the area 201 and the area 202 may be implemented by using another conventional technology.

For ease of the following description, glass of the area 202 and glass of an area similar to the area 202 in embodiments of this application are referred to as variable transmittance glass, and transparency (herein, it indicates that transmittance is very high, and basically does not block a sight of a driver or a passenger) may be implemented by adjusting transmittance, and the transmittance may also be adjusted to block impact of an external light source on the driver or the passenger in the vehicle, for example, PDLC glass. Optionally, the vehicle sunroof glass 300, the rear windshield 400, and the vehicle window glass 600 may also include the variable transmittance glass, or the vehicle sunroof glass 300, the rear windshield 400, and the vehicle window glass 600 may be the variable transmittance glass as a whole. The variable transmittance glass disposed on the front windshield 200 can avoid glare of the driver caused by the external light source (for example, a high beam of a vehicle of an opposite direction or sunlight emitted to a cockpit), and can also provide light shielding for the driver or a passenger on a front passenger seat. Especially, new energy front-stop integrated glass, that is, front-stop glass extends to a top of a head to form a panoramic sunroof, is becoming more and more popular. Some areas of glass are set as the variable transmittance glass, so that a light shielding function of blocking a light source outside the vehicle, especially blocking strong light can be provided for a vehicle cockpit. The variable transmittance glass is disposed on the vehicle sunroof glass 300, the rear windshield 400, and the vehicle window glass 600. In actual application, a sunlight shielding function can be implemented by controlling transmittance of transmittance glass, thereby improving ride experience.

Further, the vehicle 100 shown in FIG. 1 and FIG. 2 further includes a cockpit camera 1 and a cockpit camera 2. The cockpit camera 1 indicates a camera disposed in a front cockpit area in a vehicle cockpit, and is configured to detect radiation areas of a driver seat and a front passenger seat in a front row area, for example, is disposed in a rear view mirror area or an A-column area of the cockpit, and is configured to detect a head posture or an eye posture of the driver. The cockpit camera 2 indicates a camera disposed in a rear cockpit area in the vehicle cockpit, and is configured to detect a radiation area of a rear seat in the rear cockpit area, for example, is disposed in a B-column area in the cockpit, and is configured to detect a posture and an article of a passenger on the rear seat. It should be noted that quantities and specific disposing areas of the cockpit camera 1 and the cockpit camera 2 are not specifically limited.

Figure 3:
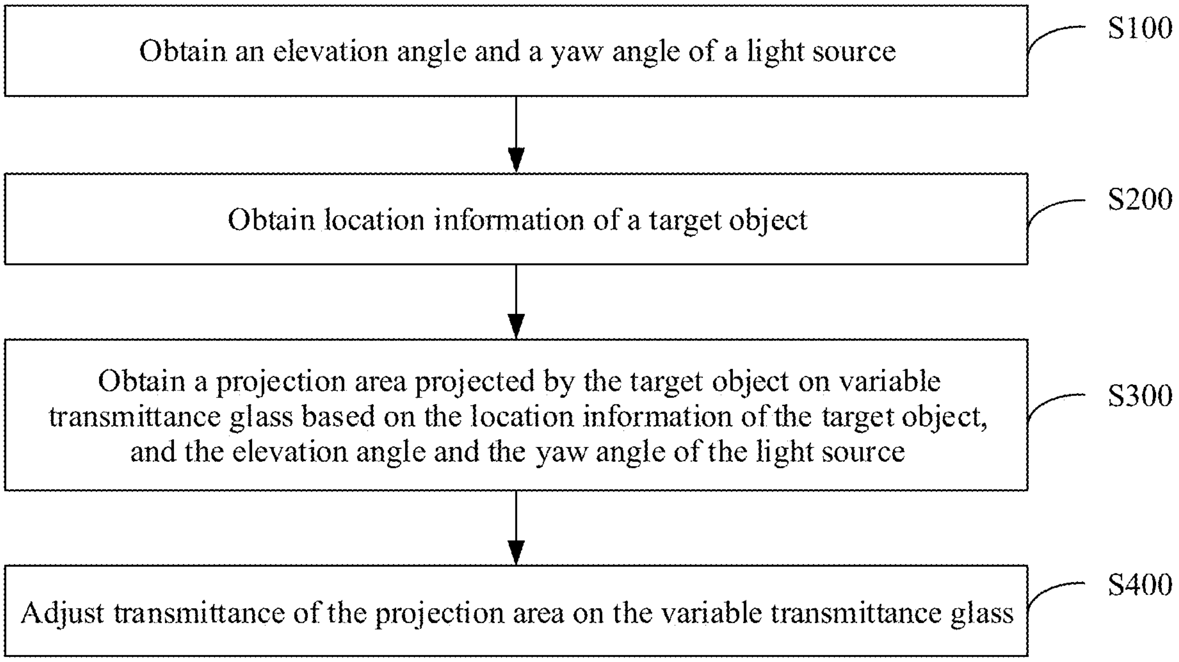
FIG. 3 is a schematic flowchart of a method for controlling variable transmittance glass according to an embodiment of this application.

The method for controlling variable transmittance glass provided in embodiments of this application may be applied to a target vehicle. Transmittance of the variable transmittance glass is adjusted to prevent the light source from shining on a target object in the target vehicle, and implement a light shielding objective, so that driving security, and driving and ride experience can be improved. As shown in FIG. 3, the method for controlling variable transmittance glass includes the following steps.

S100: Obtain an elevation angle and a yaw angle of a light source. The light source may be the sun, or may be another light source that may affect driving or ride experience, especially strong light. An objective of light shielding may be to prevent a security risk caused by impact of strong light on eyes of a driver, or may be to shield sunlight for a driver or a passenger, or may be to prevent an external light source of a vehicle from interfering with an internal environment the vehicle, for example, a sun protection effect. The elevation angle indicates an included angle between a direction in which light of the light source is emitted to the target vehicle and a horizontal plane, and the yaw angle indicates an included angle between a connection line between a projection of the light source on the horizontal plane and a centroid of a target vehicle, and a driving direction of the target vehicle. Optionally, the elevation angle and the yaw angle of the light source may be determined by using an illuminance method and a camera method described in this embodiment of this application. The illuminance method refers to calculating the elevation angle and the yaw angle of the light source based on an illuminance sensor disposed on the target vehicle. The camera method refers to calculating, based on a visual sensor disposed on the target vehicle, an elevation angle and a yaw angle of a light source in a sensible range of the visual sensor. For example, a front-view camera 500 disposed in front of the target vehicle shown in FIG. 2 may be used to calculate an elevation angle and a yaw angle of a light source located in front of the target vehicle.

S200: Obtain location information of a target object. The target object may be a head, eyes, a seat, or the like of the driver. The location information of the target object may be a coordinate matrix of the target object in a coordinate system, for example, a vehicle coordinate system or a camera coordinate system. If the target object is a head, eyes, an upper body part, or the like of a movable person, a coordinate matrix of the target object in the camera coordinate system may be obtained through a camera (for example, the cockpit camera 1 and the cockpit camera 2 described in the foregoing embodiment) disposed in a cockpit of the vehicle. If the target object is a fixed rear seat, a front passenger seat, or the like, because the rear seat and the front passenger seat are fixed relative to the target vehicle, a coordinate matrix in the vehicle coordinate system may be obtained from a storage device or cloud. The coordinate matrix is a set of coordinates indicating points of the target object in a coordinate system.

S300: Obtain a projection area projected by the target object on variable transmittance glass based on the location information of the target object, and the elevation angle and the yaw angle of the light source. The projection area may be indicated by a projection coordinate matrix of the target object on the variable transmittance glass. Optionally, the variable transmittance glass may be specifically variable transmittance glass, for example, front windshield, left and right vehicle window glass, vehicle sunroof glass, or rear windshield. For example, a front windshield disposed with the variable transmittance glass may block direct radiation of a headlight of the sun/an incoming vehicle in front of the target vehicle to the eyes of the driver by using the light shielding method provided in this embodiment of this application, thereby avoiding glare of the driver. For example, a spatial projection vector is obtained based on the elevation angle and the yaw angle of the light source, and then the projection area projected by the target object on the variable transmittance glass is obtained based on the location information of the target object and the spatial projection vector. During specific implementation, coordinate system conversion of location information of target coordinates is further involved, that is, a method for converting coordinates (or a coordinate matrix) in one coordinate system into coordinates (or a coordinate matrix) in another coordinate system may use the conventional technology, and this is not limited.

S400: Adjust transmittance of the projection area on the variable transmittance glass. Specifically, the method further includes: detecting brightness of a surface of the target object in real time through the camera; and when the brightness of the surface of the target object reaches preset brightness, stopping adjusting transmittance of an area corresponding to the projection coordinate matrix on the variable transmittance glass.

Figure 4:
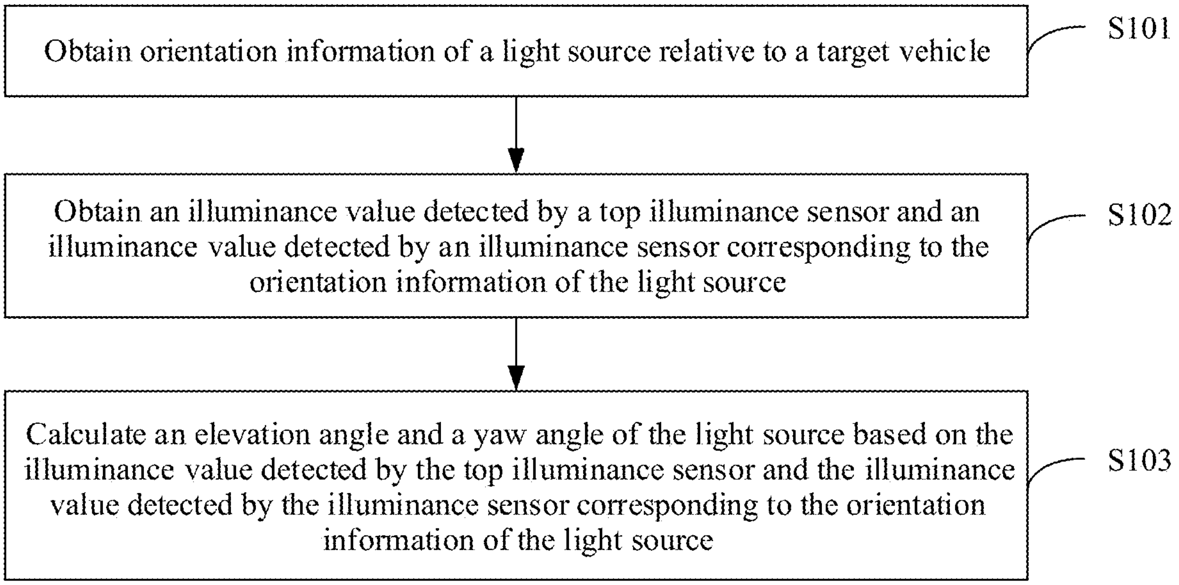
FIG. 4 is a flowchart of an illuminance method for obtaining an elevation angle and a yaw angle of a light source according to an embodiment of this application.

Optionally, an embodiment of this application provides an illuminance method for obtaining an elevation angle and a yaw angle of a light source. As shown in FIG. 4, the method specifically includes the following steps.

S101: Obtain orientation information of a light source relative to a target vehicle. Specifically, the orientation information of the light source relative to the target vehicle refers to an orientation of the light source relative to the target vehicle, for example, the light source is in front, rear, left, right, front left, front right, rear left, or rear right of the target vehicle. The target vehicle indicates a vehicle that needs light shielding processing, and the target vehicle may be the vehicle 100 shown in FIG. 1 and FIG. 2.

There are many methods for obtaining the orientation information of the light source relative to the target vehicle, for example, detection through an external visual sensor or inputting by a user. This embodiment of this application provides a method for obtaining orientation information of a light source. In the method, an orientation of the light source relative to a target vehicle is determined through an illuminance sensor disposed on the target vehicle. Locations and a quantity of illuminance sensors disposed on the target vehicle may be determined based on a design or a function requirement. The vehicle 100 shown in FIG. 2 is used as an example. For the vehicle 100 shown in FIG. 2, five illuminance sensors are respectively disposed on a front side, a left side, a right side, a rear side, and top of the vehicle, that is, the front side illuminance sensor 31, the left side illuminance sensor 32, the top illuminance sensor 33, the right side illuminance sensor 34, and the rear side illuminance sensor 35. The method for obtaining the orientation information of the light source is specifically described as follows:

If an illuminance value detected by the front side illuminance sensor 31 is greater than an illuminance value detected by the rear side illuminance sensor 35, and an illuminance value detected by the left side illuminance sensor 32 is greater than an illuminance value detected by the right side illuminance sensor 34, it may be learned that the orientation information of the light source is that the light source is in a left front direction of the target vehicle. If the illuminance value detected by the front side illuminance sensor 31 is less than the illuminance value detected by the rear side illuminance sensor 35, and the illuminance value detected by the left side illuminance sensor 32 is greater than the illuminance value detected by the right side illuminance sensor 34, it may be learned that the orientation information of the light source is that the light source is in a left rear direction of the target vehicle. If the illuminance value detected by the front side illuminance sensor 31 is greater than the illuminance value detected by the rear side illuminance sensor 35, and the illuminance value detected by the left side illuminance sensor 32 is less than the illuminance value detected by the right side illuminance sensor 34, it may be learned that the orientation information of the light source is that the light source is in a right front direction of the target vehicle. If the illuminance value detected by the front side illuminance sensor 31 is less than the illuminance value detected by the rear side illuminance sensor 35, and the illuminance value detected by the left side illuminance sensor 32 is less than the illuminance value detected by the right side illuminance sensor 34, it may be learned that the orientation information of the light source is that the light source is in a right rear direction of the target vehicle. It should be noted that a case in which "less than" and "greater than" described above does not exclude "equal to", may be that "less than" includes "equal to", or may be that "greater than" includes "equal to".

S102: Obtain an illuminance value detected by a top illuminance sensor and an illuminance value detected by an illuminance sensor corresponding to the orientation information of the light source. The "illuminance sensor corresponding to the orientation information of the light source" herein refers to an illuminance sensor in an orientation of the light source. For example, in this embodiment of this application, if the light source is in left front of the target vehicle, the illuminance sensor corresponding to the orientation information of the light source refers to the front side illuminance sensor 31 and the left side illuminance sensor 32. If the light source is in left rear of the target vehicle, the illuminance sensor corresponding to the orientation information of the light source refers to the left side illuminance sensor 32 and the rear side illuminance sensor 35. If the light source is in right front of the target vehicle, the illuminance sensor corresponding to the orientation information of the light source refers to the front side illuminance sensor 31 and the right side illuminance sensor 34. If the light source is in right rear of the target vehicle, the illuminance sensor corresponding to the orientation information of the light source refers to the right side illuminance sensor 34 and the rear side illuminance sensor 35.

S103: Calculate the elevation angle and the yaw angle of the light source based on the illuminance value detected by the top illuminance sensor and the illuminance value detected by the illuminance sensor corresponding to the orientation information of the light source.

Figure 5:
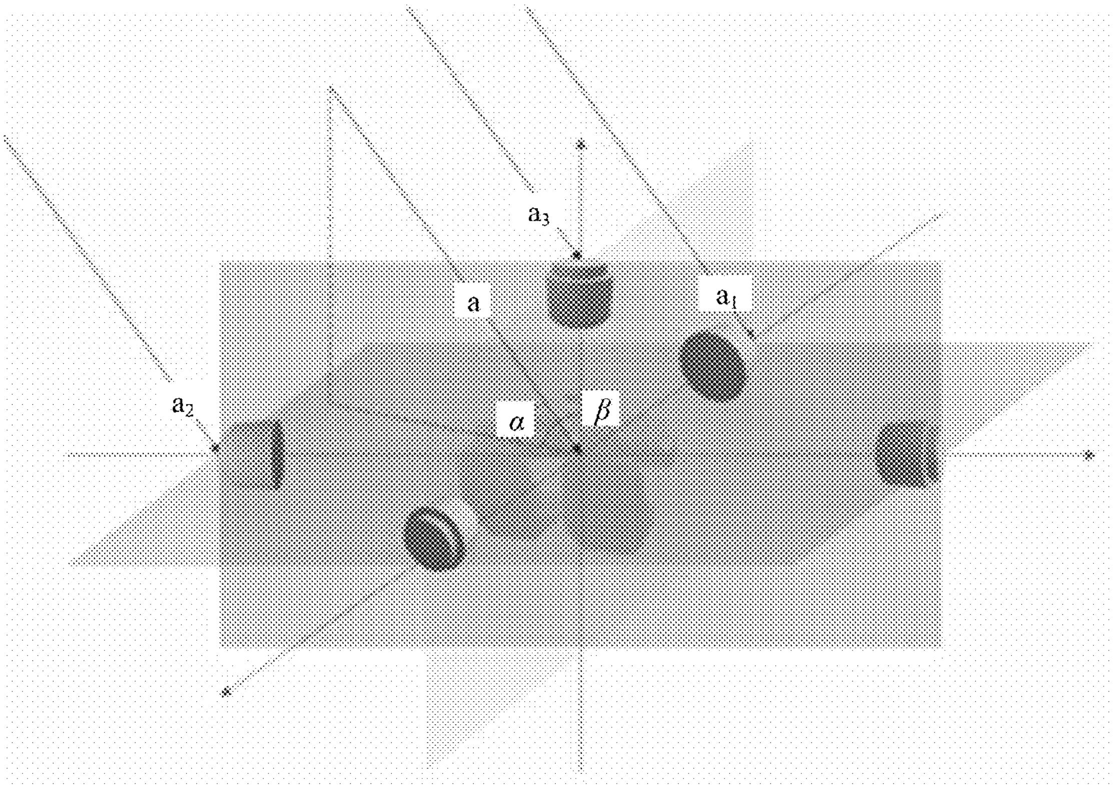
FIG. 5 is a schematic diagram of a relationship of an included angle between vertical planes according to an embodiment of this application.

For example, a location layout of the illuminance sensor involved in calculating the elevation angle and the yaw angle of the light source through the illuminance sensor may meet a relationship of an included angle between vertical planes. Illuminance sensor disposition shown in FIG. 2 is used as an example, and a schematic diagram of a relationship of an included angle between vertical planes shown in FIG. 5 may be obtained. For example, the orientation information of the light source is located in left front of the target vehicle, that is, the elevation angle and the yaw angle of the light source are calculated based on illuminance values respectively detected by the front side illuminance sensor 31, the left side illuminance sensor 32, and the top illuminance sensor. The following formula may be obtained based on the relationship of the included angle between the vertical planes shown in FIG. 5:

$$a_1 = a \cos\alpha \cos\beta \tag{1}$$

$$a_2 = a \cos\alpha \sin\beta \tag{2}$$

$$a_3 = a \sin\alpha \tag{3}$$

The following formulas may be obtained according to formulas (1), (2), and (3):

$$\alpha = \arctan\left(\frac{a_3}{a_1}\cos\beta\right) \tag{4}$$

$$\beta = \arctan\frac{a_2}{a_1} \tag{5}$$

In the foregoing formula, a indicated normal illuminance of the light source, $a_1$ indicated the illuminance value detected by the front side illuminance sensor, $a_2$ indicated the illuminance value detected by the left side illuminance sensor, $a_3$ indicated the illuminance value detected by the top illuminance sensor, α indicates the elevation angle of the light source, and β indicated the yaw angle of the light source.

Optionally, an embodiment of this application provides a camera method for obtaining an elevation angle and a yaw angle of a light source, and the method specifically includes the following steps.

S110: Capture, through a camera disposed outside a target vehicle, an image including the light source. The light source is within a sensing range of the camera.

Figure 6:
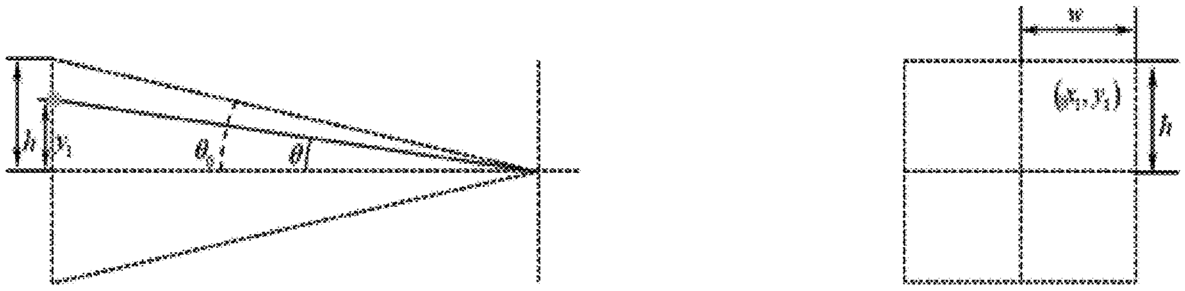
FIG. 6 is a schematic diagram of a relationship of projection of a light source on an image according to an embodiment of this application.

S120: Calculate the elevation angle and the yaw angle of the light source based on coordinates of the light source in an image coordinate system and an image parameter. Refer to FIG. 6. The elevation angle and the yaw angle of the light source may be calculated by using the following formulas:

$$\theta = \arctan\left(\frac{y_0}{h}\tan\theta_0\right)$$

$$\delta = \arctan\left(\frac{x_1}{y_1}\tan\theta\right)$$

In the foregoing formula, θ indicates the elevation angle of the light source, δ indicates the yaw angle of the light source, (x1, y1) indicates a coordinate point of the light source in the image captured by the camera, w is a half width of the image captured by the camera, h is a ½ height of the image captured by the camera, and $\theta_0$ indicates a ½ cone angle of the camera.

Optionally, with reference to the illuminance method and the camera method described above, an embodiment of this application further provides a dual determining mode based on a combination of the illuminance method and the camera method to obtain an elevation angle and a yaw angle of a light source. Compared with a result obtained by using the illuminance method or the camera method alone, this dual determining mode has higher precision, and has a better effect. The mode may specifically include:

obtaining a difference between the elevation angle α of the light source obtained by using the illuminance method and the elevation angle θ of the light source obtained by using the camera method, and obtaining a difference between the yaw angle β of the light source obtained by using the illuminance method and the yaw angle δ of the light source obtained by using the camera method, where the difference mentioned above is an absolute value of a difference between the two.

When the difference between the elevation angle α and the elevation angle θ is less than or equal to a preset value, and the difference between the yaw angle β and the yaw angle δ is less than or equal to the preset value, the elevation angle of the light source is an average value of the elevation angle α and the elevation angle θ, that is, the elevation angle of the light source=(α+θ)/2. The yaw angle of the light source is an average value of the yaw angle β and the yaw angle δ, that is, the yaw angle of the light source=(β+δ)/2.

When the difference between the elevation angle α and the elevation angle θ is less than or equal to the preset value, and the difference between the yaw angle β and the yaw angle δ is greater than the preset value, the elevation angle of the light source is the average value of the elevation angle α and the elevation angle θ, that is, the elevation angle of the light source=(α+θ)/2. The yaw angle of the light source includes the yaw angle β and the yaw angle δ, and may indicate that the yaw angle of the light source=β+δ.

When the difference between the elevation angle α and the elevation angle θ is greater than the preset value, and the difference between the yaw angle β and the yaw angle δ is less than or equal to the preset value, the elevation angle of the light source includes the elevation angle α and the elevation angle θ, and may indicate that the elevation angle of the light source=α+θ. The yaw angle of the light source is the average value of the yaw angle β and the yaw angle δ, that is, the yaw angle of the light source=(β+δ)/2.

When the difference between the elevation angle α and the elevation angle θ is greater than the preset value, and the difference between the yaw angle β and the yaw angle δ is greater than the preset value, the elevation angle of the light source is the average value of the elevation angle α and the elevation angle θ, that is, the elevation angle of the light source=(α+θ)/2. The yaw angle of the light source is the average value of the yaw angle β and the yaw angle δ, that is, the yaw angle of the light source=(β+δ)/2.

It should be noted that the foregoing “preset value” is a preset angle value, for example, the preset value=1°, 2°, or 3°.

During specific implementation, when the sun (that is, the light source) is in front of the target vehicle, the elevation angle and the yaw angle of the light source are obtained in the dual determining mode, and when the sun (that is, the light source) is not in front of the target vehicle, the elevation angle and the yaw angle of the light source are obtained by using the illuminance method.

Figure 7:
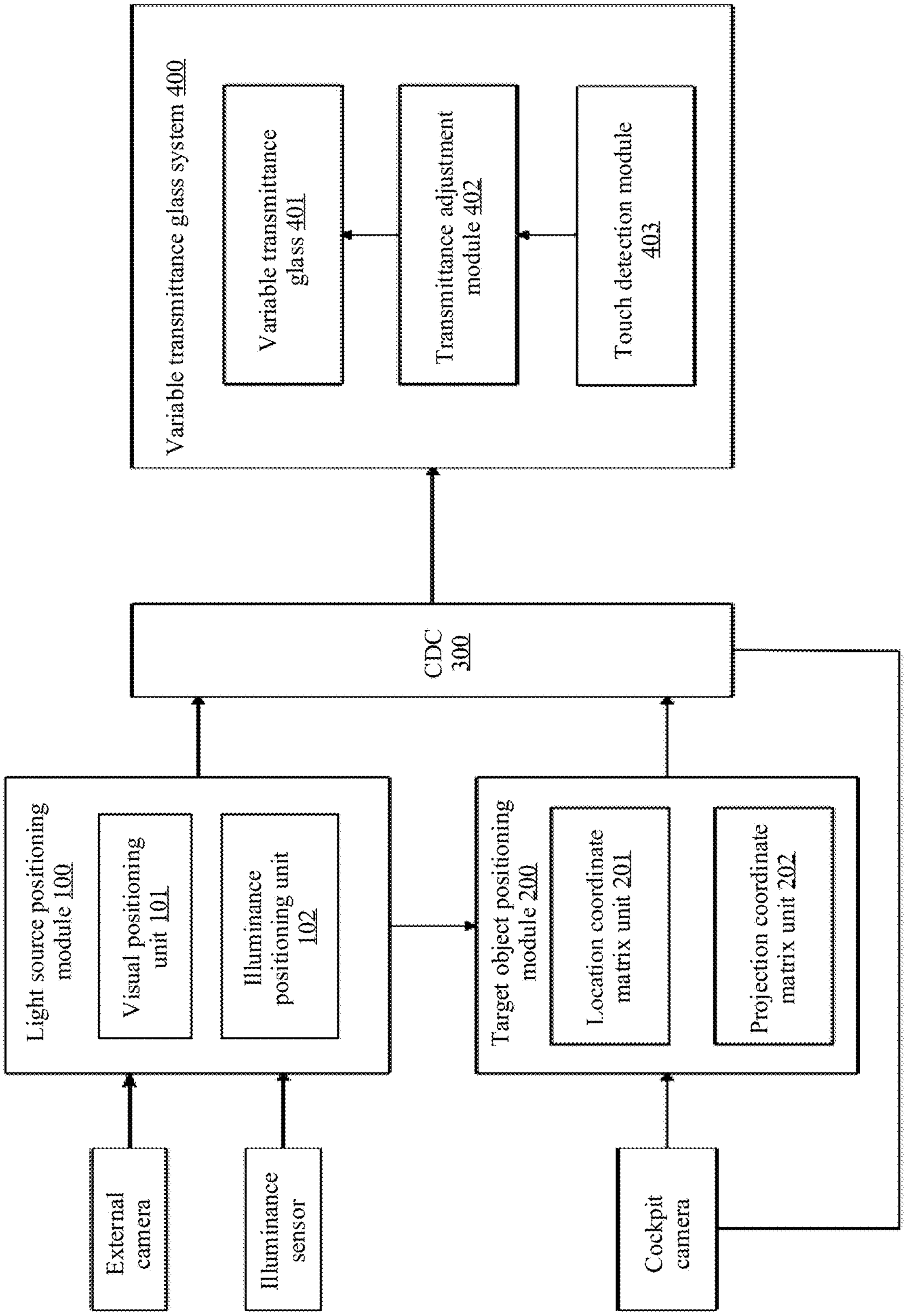
FIG. 7 is a schematic diagram of a system for controlling variable transmittance glass according to an embodiment of this application.

An embodiment of this application further provides a system for controlling variable transmittance glass, applied to a vehicle, for example, the vehicle 100 shown in FIG. 1 and FIG. 2. As shown in FIG. 7, the system for controlling variable transmittance glass specifically includes a light source positioning module 100, a target object positioning module 200, a CDC 300 (the CDC 13 shown in FIG. 1), a variable transmittance glass system 400, an external camera, an illuminance sensor, and a cockpit camera. The external camera may be the front-view camera 500 shown in FIG. 2, or may be a camera that is not marked in FIG. 2 and that is disposed on a left side, a right side, or a rear side of the vehicle. Herein, the external camera is disposed based on an actual light shielding requirement. In this embodiment of this application, the front-view camera shown in FIG. 2 is used as an example. The illuminance sensor uses the front side illuminance sensor 31, the left side illuminance sensor 32, the top illuminance sensor 33, the right side illuminance sensor 34, and the rear side illuminance sensor 35 shown in FIG. 2 as examples. The cockpit camera may include the cockpit camera 1 disposed in the front cockpit area and the cockpit camera 2 disposed in the rear cockpit area as described above.

The light source positioning module 100 is configured to determine an elevation angle and a yaw angle of a light source, for example, configured to perform step S100 described in the foregoing embodiments of this application. The light source positioning module 100 may specifically include a visual positioning unit 101 and an illuminance positioning unit 102. The visual positioning unit 101 is configured to determine the elevation angle and the yaw angle of the light source by using a camera method, and the illuminance positioning unit 102 is configured to determine the elevation angle and the yaw angle of the light source by using an illuminance method. For the camera method and the illuminance method, refer to the foregoing specific descriptions of related embodiments of this application.

The target object positioning module 200 is configured to determine a projection area of a target object on variable transmittance glass, for example, configured to perform steps S200 and S300 described in the foregoing embodiments of this application. The target object positioning module 200 specifically includes a location coordinate matrix unit 201 and a projection coordinate matrix unit 202. The location coordinate matrix unit 201 is configured to determine a location coordinate matrix of the target object in a coordinate system, for example, configured to perform step S200 described in the foregoing embodiments of this application. The projection coordinate matrix unit 202 is configured to determine a projection coordinate matrix of the target object on the variable transmittance glass based on a spatial projection vector, for example, configured to perform step S300 described in the foregoing embodiments of this application.

The CDC 300 is configured to send, to the variable transmittance glass system 400, a control instruction for adjusting transmittance of the projection area, to change the transmittance of the projection area. The variable transmittance glass system 400 specifically includes variable transmittance glass 401, a transmittance adjustment module 402, and a touch detection module 403. For example, the CDC 300 sends, to the transmittance adjustment module 402, a control instruction for adjusting transmittance of the variable transmittance glass 401. Optionally, the control instruction may specifically include an instruction for adjusting the transmittance of the variable transmittance glass 401 to a specific degree. The CDC 300 may further send, to the transmittance adjustment module 402 based on a brightness change of the target object detected by the cockpit camera, a control instruction for stopping adjusting the transmittance of the variable transmittance glass 401, that is, when detecting that the brightness change of the target object reaches a preset degree, the CDC 300 sends, to the transmittance adjustment module 402, the control instruction for stopping adjusting the transmittance of the variable transmittance glass 401.

It should be noted that the system for controlling the variable transmittance glass shown in FIG. 7 is merely an example. During specific implementation, one or more of the light source positioning modules 100, the target object positioning module 200, the transmittance adjustment module 402, and the touch detection module 403 may be integrated into the CDC 300. Optionally, functions of the CDC 300 may be implemented by the MDC 14, the VDC 15, or the VIU shown in FIG. 1.

Figure 8:
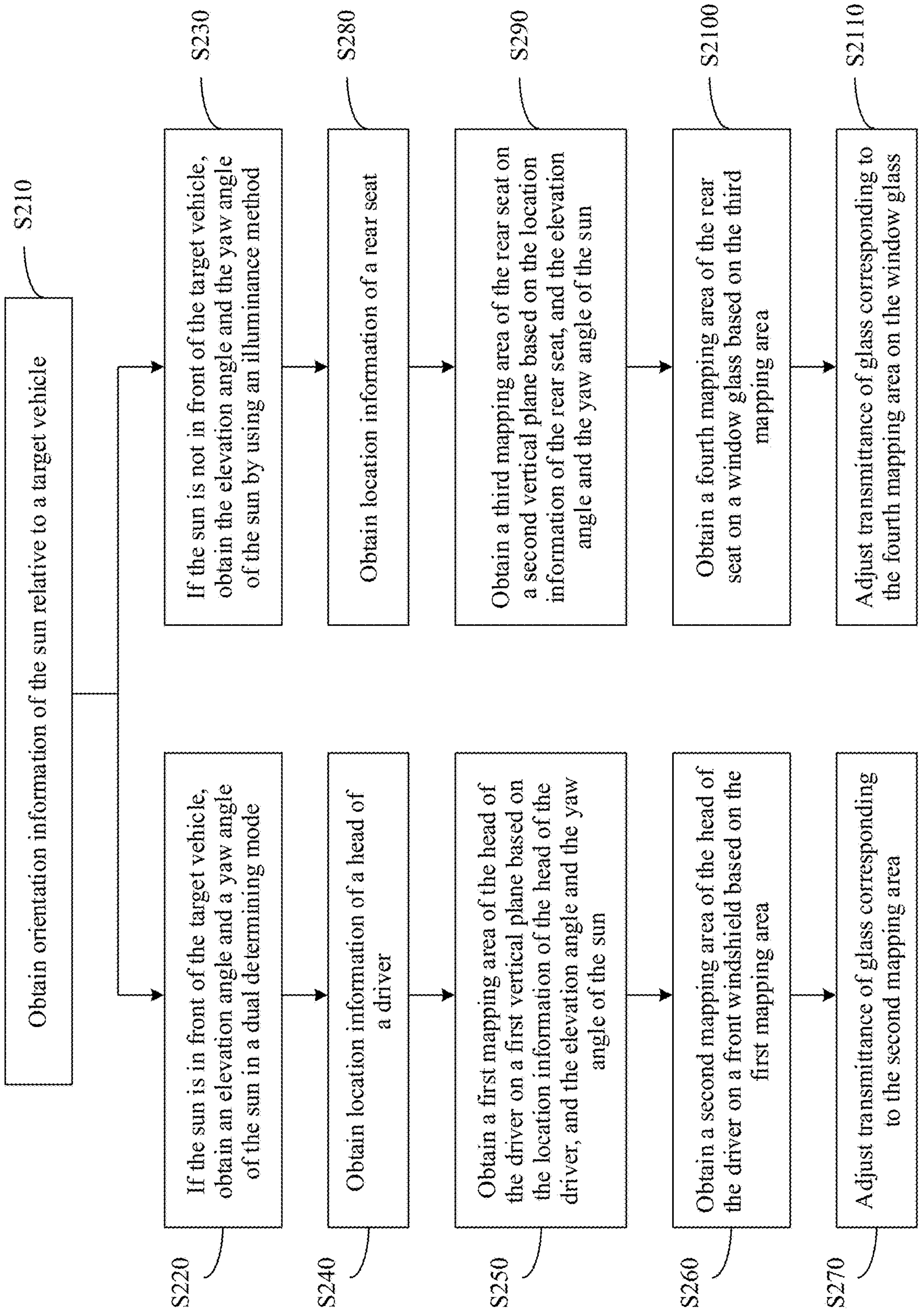
FIG. 8 is a schematic flowchart of another method for controlling variable transmittance glass according to an embodiment of this application.

With reference to the foregoing related descriptions of embodiments of this application, for example, a light source is the sun, an embodiment of this application provides a method for controlling variable transmittance glass. For a target vehicle in this embodiment of this application, refer to the vehicle 100 described in the embodiments corresponding to FIG. 1 and FIG. 2. In a specific example, the area 202 of the front windshield 200 of the target vehicle is the variable transmittance glass, the vehicle sunroof glass 300 is the variable transmittance glass, the front-view camera 500 is optionally a binocular camera, the cockpit camera 1 is disposed at a column A in a cockpit, and the cockpit camera 2 is disposed at a column B in a cockpit. As shown in FIG. 8, the method for controlling the variable transmittance glass specifically includes the following steps.

S210: Obtain orientation information of the sun relative to the target vehicle. Specifically, the orientation information of the light source relative to the target vehicle refers to an orientation of the light source relative to the target vehicle, for example, the sun is in front, rear, left, or right of the target vehicle. Optionally, the orientation information of the sun relative to the target vehicle is obtained by using an illuminance method. For specific descriptions of the illuminance method, refer to step S101 in the illuminance method described in the foregoing embodiments of this application. Specifically, when illuminance detected by the front side illuminance sensor 31 is greater than illuminance detected by the rear side illuminance sensor 35, it may be learned that the sun is in front of the target vehicle. The orientation information of the sun relative to the target vehicle is obtained to determine which areas have a light shielding requirement. In this embodiment of this application, it is assumed that when the sun is generally located in front of the target vehicle, a target object that needs light shielding is a head/eyes of a driver, and light shielding is implemented by adjusting transmittance of the variable transmittance glass on the front windshield of the target vehicle.

With reference to FIG. 7, during specific implementation, the orientation information of the sun relative to the target vehicle is determined by the illuminance positioning unit 102 based on illuminance detected by illuminance sensors (the front side illuminance sensor 31, the left side illuminance sensor 32, the top illuminance sensor 33, the right side illuminance sensor 34, and the rear side illuminance sensor 35) and location/direction information of each illuminance sensor.

S220: If the sun is in front of the target vehicle, obtain an elevation angle and a yaw angle of the sun in a dual determining mode. For the dual determining mode, refer to related descriptions in the foregoing embodiments, and details are not described herein again.

S230: If the sun is not in front of the target vehicle, obtain the elevation angle and the yaw angle of the sun by using an illuminance method. For the illuminance method, refer to related descriptions in the foregoing embodiments. Details are not described herein again.

In this embodiment of this application, when the sun is in front of the vehicle, the transmittance of the variable transmittance glass on the front windshield is controlled to be reduced, to perform light shielding on the head of the driver, thereby improving driving security. When the sun is not in front of the vehicle, the transmittance of a vehicle window (which is a type of variable transmittance glass) is controlled to be reduced, to perform light shielding on a passenger on a rear seat.

After S220, the method for controlling the variable transmittance glass further includes the following steps.

S240: Obtain location information of the head of the driver. Because a location of the head of the driver changes, the location information of the head of the driver needs to be obtained in real time. Optionally, the location information of the head of the driver may be identified through the cockpit camera 1.

S250: Obtain a first mapping area of the head of the driver on a first vertical plane based on the location information of the head of the driver, and the elevation angle and the yaw angle of the sun. The first vertical plane refers to a plane that is perpendicular to a plane on which a chassis of the target vehicle is located and that passes through an upper edge of the front windshield.

S260: Obtain a second mapping area of the head of the driver on the front windshield based on the first mapping area, where glass of the second mapping area is the variable transmittance glass, and the second mapping area may be understood as a projection area in which the head of the driver is projected on the front windshield along a reverse direction of a projection direction of the light source.

S270: Adjust transmittance of glass corresponding to the second mapping area. Specifically, the transmittance is reduced to reach a light shielding degree.

Figure 9:
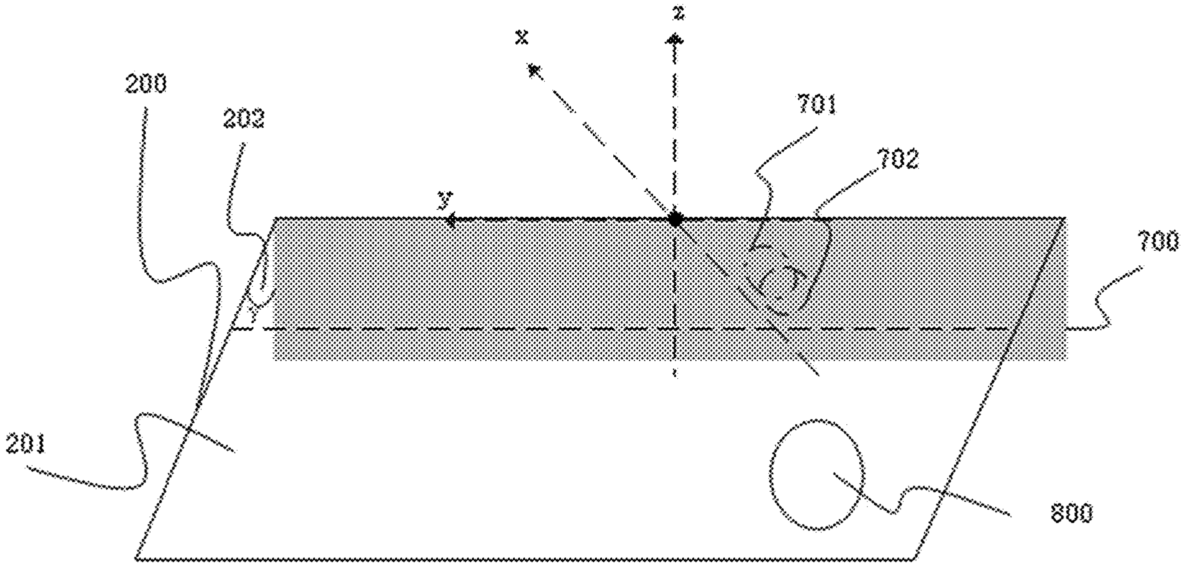
FIG. 9 is a schematic diagram of a front windshield and a vertical plane according to an embodiment of this application.

As shown in FIG. 9, in an x-y-z rectangular coordinate system, a midpoint of the upper edge of the front windshield 200 is a primitive center, a y axis is the upper edge of the front windshield 200, a z axis passes through the midpoint of the upper edge of the front windshield 200 and is perpendicular to the plane on which the chassis of the target vehicle is located, and an x axis is perpendicular to the y axis and the z axis. 700 in FIG. 9 is the first vertical plane, that is, a plane formed by points whose x=0 in a three-dimensional coordinate system, 702 indicates the first mapping area, 701 indicates the second mapping area, and 800 indicates the head of the driver.

The location information of the head of the driver described above is represented by a first coordinate matrix, and the first coordinate matrix is a coordinate set representing points of the head of the driver in a preset coordinate system. The preset coordinate system may be a camera coordinate system, for example, a three-dimensional rectangular coordinate system established by using the cockpit camera 1 as a focus center as an origin and an optical axis of the cockpit camera 1 as a Z axis. Alternatively, the preset coordinate system may be a vehicle coordinate system, for example, a center of mass of the target vehicle is used as an origin, an X axis is parallel to the ground and points to front of the vehicle, a Z axis points to top through the center of mass of the vehicle, and a Y axis points to a left side of the driver.

The foregoing step S250 specifically includes: determining the first mapping area 702 based on the first coordinate matrix and a space vector, where the space vector s=(cos α sin β, sin β, cos α cos β), α is the elevation angle of the sun, and —3 is the yaw angle of the sun. The step includes:

Coordinates $(x_d, y_d, z_d)$ of a point in the first coordinate matrix are used as an example. A point-crossing straight line equation is obtained based on the coordinates $(x_d, y_d, z_d)$ and a space vector s. The point-passing straight line equation indicates a straight line in which a solar beam passing through the coordinates ($x_d$, $y_d$, $z_d$) is located, because the coordinates ($x_d$, $y_d$, $z_d$) indicates a point on the head of the driver, therefore, the point-passing straight line equation may also be referred to as a head-passing straight line equation. A formula of the point-passing straight line equation is as follows:

$$\frac{x - x_d}{\cos\alpha\sin\beta} = \frac{y - y_d}{\sin\alpha} = \frac{z - z_d}{\cos\alpha\cos\beta}$$

Further, an intersection point between the point-passing straight line equation and the first vertical plane 700 is obtained, where the intersection point between the point-passing straight line equation and the first vertical plane is a point at which the coordinates ($x_d$, $y_d$, $z_d$) are mapped on the first vertical plane 700. It can be learned from FIG. 9 that x of coordinates of all points on the first vertical plane 700 equals to 0. Therefore, x of the intersection point between the point-passing straight line equation and the first vertical plane equals to 0. Further, coordinates of the intersection point in the three-dimensional rectangular coordinate system shown in FIG. 9 may be obtained based on the space vector and the point-passing straight line equation as follows:

$$\left(0,\ y_d + \sin\alpha\frac{x_0 - x_d}{\cos\alpha\sin\beta},\ z_d + \cos\beta\frac{x_0 - x_d}{\sin\beta}\right)$$

Similarly, points that are of each point in the first coordinate matrix and that are mapped on the first vertical plane 700 may be obtained. The second coordinate matrix including coordinates of these points is used to indicate the second mapping area 701, and indicates a projection of the head of the driver on the first vertical plane.

The foregoing step S260 specifically includes: mapping a point in the second coordinate matrix to the front windshield based on an included angle γ between the first vertical plane and the front windshield, that is, converting coordinates of each point in the second coordinate matrix to coordinates of a point on the front windshield. The point mapped on the front windshield can also be understood as an intersection point between the straight line equation and the front windshield. Coordinates of any point in the second coordinate matrix are converted into coordinates of a point on the front windshield, which may be expressed as:

$$\left(\frac{Z_d}{\tan\gamma} + \cos\beta\frac{x_0 - x_d}{\sin\beta\tan\gamma},\ y_d + \sin\alpha\frac{x_0 - x_d}{\cos\alpha\sin\beta},\ z_d + \cos\beta\frac{x_0 - x_d}{\sin\beta}\right)$$

It should be noted that FIG. 9 is merely a schematic diagram. In practice, the front windshield is a curved surface, and the first vertical plane is a plane. The included angle γ between the front windshield and the first vertical plane varies with a location of a point on the front windshield. In this case, the included angle γ is an included angle between an intersection line A and an intersection line B, where the intersection line A is an intersection line of a normal plane of a point (x, y, z) of the front windshield and a plane indicated by (x, 0, z) in a coordinate system, and the intersection line B is an intersection line between the first vertical plane and the plane indicated by (x, 0, z) in the coordinate system. A third coordinate matrix including coordinates of all points that are mapped by all points of the second coordinate matrix on the front windshield, is used to indicate the second mapping area 701, and indicates a projection of the head of the driver on the front windshield. The third coordinate matrix is represented as follows:

$$\begin{bmatrix} \left(\frac{z_{n0}}{\tan\gamma}, -y_{ni}, z_{n0}\right) & \cdots & \left(\frac{z_{n0}}{\tan\gamma}, -y_{n1}, z_{n0}\right) & \left(\frac{z_{n0}}{\tan\gamma}, y_{n0}, z_{n0}\right) & \left(\frac{z_{n0}}{\tan\gamma}, y_{n1}, z_{n0}\right) & \cdots & \left(\frac{z_{n1}}{\tan\gamma}, y_{ni}, z_{n1}\right) \\ \left(\frac{z_{n1}}{\tan\gamma}, -y_{ni}, z_{n1}\right) & \cdots & \left(\frac{z_{n1}}{\tan\gamma}, -y_{n1}, z_{n1}\right) & \left(\frac{z_{n1}}{\tan\gamma}, y_{n0}, z_{n1}\right) & \left(\frac{z_{n1}}{\tan\gamma}, y_{n1}, z_{n1}\right) & \cdots & \left(\frac{z_{n2}}{\tan\gamma}, y_{ni}, z_{n2}\right) \\ \vdots & \iddots & \vdots & \vdots & \vdots & \ddots & \vdots \\ \left(\frac{z_{nj}}{\tan\gamma}, -y_{ni}, z_{nj}\right) & \cdots & \left(\frac{z_{n1}}{\tan\gamma}, -y_{ni}, z_{n1}\right) & \frac{z_{nj}}{\tan\gamma}, y_{n0}, z_{nj} & \left(\frac{z_{n1}}{\tan\gamma}, y_{ni}, z_{n1}\right) & \cdots & \left(\frac{z_{nj}}{\tan\gamma}, y_{ni}, z_{nj}\right) \end{bmatrix}$$

Step S270 includes: adjusting transmittance of an area corresponding to the third coordinate matrix of the front windshield. Optionally, the transmittance of the area corresponding to the third coordinate matrix is adjusted to a fixed value (for example, 0% or 20%). Optionally, the transmittance of the area corresponding to the third coordinate matrix is reduced, brightness detection is performed on the head of the driver while the transmittance is reduced, and when it is detected that brightness of the head of the driver reaches a preset value, the transmittance is stopped being reduced. On the contrary, when it is detected that the brightness of the head of the driver is less than the preset value, the transmittance of the area corresponding to the third coordinate matrix may be increased. It should be noted that a color presented by reducing the transmittance of the variable transmittance glass is not limited, so that a color image can be displayed to reduce the transmittance.

Similarly, after step S230, in this embodiment of this application, the following is described: transmittance of vehicle window glass of the vehicle is controlled to provide light shielding for the passenger on the rear seat. A procedure is similar to that of S240 to S270, and a difference lies in that:

after step S230, as shown in FIG. 8, the method for controlling the variable transmittance glass further includes the following steps.

S280: Obtain location information of the rear seat. The seat is fixed relative to the target vehicle, and location information of the seat does not need to be detected in real time. The location information of the seat may be pre-stored in the target vehicle. For example, the location information of the seat may be indicated by a coordinate set of points on a rear seat contour in a vehicle coordinate system. Herein, the rear seat is used as an example, and may also be a front seat. The location information of the seat rather than location information of a passenger on the seat is used. Light shielding is performed on an area in which the seat is located to perform light shielding on the passenger on the seat, and the location information of the passenger does not need to be detected, thereby improving method efficiency. In addition, performing light shielding of the seat can better perform light shielding on the passenger on the seat, and a light shielding area is wider.

S290: Obtain a third mapping area of the rear seat on a second vertical plane based on the location information of the rear seat, and the elevation angle and the yaw angle of the sun. The second vertical plane refers to a plane that is perpendicular to a plane on which a chassis of the target vehicle is located and that passes through an upper edge of the vehicle window glass.

S2100: Obtain a fourth mapping area of the rear seat on the vehicle window glass based on the third mapping area, where glass of the fourth mapping area is variable transmittance glass. Optionally, the entire vehicle window glass is variable transmittance glass.

S2110: Adjust transmittance of glass corresponding to the fourth mapping area on the vehicle window glass. For specific descriptions of the steps, refer to corresponding steps in steps S240 to S270 described above, and details are not described herein again.

The foregoing method for controlling the variable transmittance glass may be implemented by the system for controlling the variable transmittance glass shown in FIG. 7. For example, the CDC 300 receives an elevation angle and a yaw angle of the sun output by the visual positioning unit 101, and an elevation angle and a yaw angle of the sun output by the illuminance positioning unit 102. The CDC 300 determines a final elevation angle and yaw angle of the sun based on the received elevation angle and the yaw angle output by the visual positioning unit 101 or/and the illuminance positioning unit 102. Further, the CDC 300 performs other steps.

Figure 10:
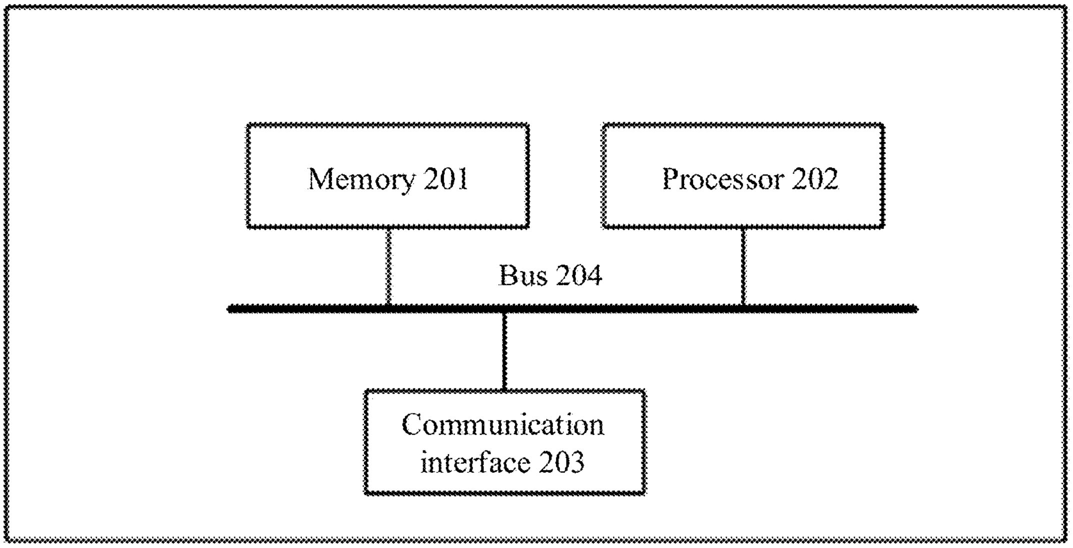
FIG. 10 is a schematic diagram of a light shielding apparatus according to an embodiment of this application.

An embodiment of this application provides an apparatus, applied to a vehicle, for controlling variable transmittance glass. Refer to FIG. 10. An apparatus 200 for controlling the variable transmittance glass may implement the method for controlling the variable transmittance glass described in the embodiments corresponding to FIG. 3, FIG. 4, and FIG. 8. The apparatus 200 for controlling the variable transmittance glass includes a memory 201, a processor 202, a communication interface 203, and a bus 204. The memory 201, the processor 202, and the communication interface 203 are communicatively connected to each other through the bus 204.

The memory 201 may be a read-only memory, a static storage device, a dynamic storage device, or a random access memory. The memory 201 may store a program. When the program stored in the memory 201 is executed by the processor 202, the processor 202 is configured to perform the method 100 for controlling the variable transmittance glass described in the embodiments of this application corresponding to FIG. 3, FIG. 4, and FIG. 8.

The processor 202 may be a general-purpose central processing unit, a microprocessor, an application-specific integrated circuit, a graphics processing unit (GPU), or one or more integrated circuits, and is configured to execute a related program, to implement a function that needs to be performed by the system for controlling the variable transmittance glass in embodiments of this application, or perform the method for controlling the variable transmittance glass described in embodiments of this application.

Alternatively, the processor 202 may be an integrated circuit chip having a signal processing capability. In an implementation process, steps of the method for controlling the variable transmittance glass in embodiments of this application may be implemented through an integrated logic circuit of hardware in the processor 202, or through instructions in a form of software. The processor 202 may be a general-purpose processor, a digital signal processing (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. A software module may be located in a mature storage medium in the art, like a random access memory, a flash memory, a read-only memory, a programmable read-only memory, an electrically erasable programmable memory, or a register. The storage medium is located in the memory 201. The processor 202 reads information in the memory 201, and completes, in combination with hardware (for example, the variable transmittance glass) of the processor 202, functions that need to be performed by modules included in the system for controlling the variable transmittance glass in embodiments of this application, or performs the method for controlling the variable transmittance glass in embodiments of this application.

The communication interface 203 uses a transceiver apparatus, for example, but not limited to a transceiver, to implement communication between the apparatus 200 for controlling the variable transmittance glass and another device or a communication network. For example, data output by a camera and an illuminance sensor may be received through the communication interface 203.

The bus 204 may include a path for transmitting information between components (for example, the memory 201, the processor 202, and the communication interface 203) of the apparatus 200 for controlling the variable transmittance glass.

It should be noted that although only the memory, the processor, and the communication interface are shown in the apparatus 200 for controlling the variable transmittance glass shown in FIG. 10, in a specific implementation process, a person skilled in the art should understand that the apparatus 200 for controlling the variable transmittance glass further includes another component required for implementing normal running. In addition, according to a specific requirement, a person skilled in the art should understand that the apparatus 200 for controlling the variable transmittance glass may further include a hardware component for implementing another additional function. In addition, a person skilled in the art should understand that the apparatus 200 for controlling the variable transmittance glass may include only components necessary for implementing embodiments of this application, and does not need to include all components shown in FIG. 10.

Finally, it should be noted that the foregoing embodiments are merely intended for describing the technical solutions of this application other than limiting this application. Although this application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A method for controlling variable transmittance glass of a target vehicle, the method comprising:

obtaining an elevation angle and a yaw angle of a light source;

obtaining location information of a target object within the target vehicle;

obtaining a mapping area of the target object on the variable transmittance glass based on the location information of the target object, and the elevation angle and the yaw angle of the light source, including obtaining a mapping area of the target object on a vertical plane based on the location information of the target object, and the elevation angle and the yaw angle of the light source, wherein the vertical plane indicates a plane perpendicular to a plane on which a chassis of the target vehicle is located and that passes through and includes an upper edge of the variable transmittance glass; and obtaining the mapping area of the target object on the variable transmittance glass based on an included angle between the vertical plane and the variable transmittance glass and the mapping area of the target object on the vertical plane; and adjusting a transmittance of the mapping area of the target object on the variable transmittance glass.

2. The method according to claim 1, further comprising:

obtaining orientation information of the light source relative to a target vehicle.

3. The method according to claim 2, wherein the obtaining an elevation angle and a yaw angle of a light source comprises:

obtaining the elevation angle and the yaw angle of the light source based on a first illuminance value and a second illuminance value, wherein the first illuminance value is an illuminance value detected by a top illuminance sensor disposed on top of the target vehicle, and the second illuminance value comprises an illuminance value detected by an illuminance sensor disposed on the target vehicle and that corresponds to the orientation information.

4. The method according to claim 2, wherein the obtaining an elevation angle and a yaw angle of a light source comprises:

obtaining a first elevation angle and a first yaw angle of the light source based on an image captured by a camera and that comprises the light source and an intrinsic parameter of the camera;

obtaining a second elevation angle and a second yaw angle of the light source based on a third illuminance value and a fourth illuminance value, wherein the third illuminance value is an illuminance value detected by a top illuminance sensor disposed on top of the target vehicle, and the fourth illuminance value comprises an illuminance value detected by an illuminance sensor disposed on the target vehicle and that corresponds to the orientation information; and obtaining the elevation angle and the yaw angle of the light source based on the first elevation angle, the second elevation angle, the first yaw angle, and the second yaw angle.

5. The method according to claim 4, wherein the obtaining the elevation angle and the yaw angle of the light source based on the first elevation angle, the second elevation angle, the first yaw angle, and the second yaw angle comprises:

on the basis of a difference between the first elevation angle and the second elevation angle and a difference between the first yaw angle and the second yaw angle, obtaining the elevation angle of the light source based on the first elevation angle and the second elevation angle, and obtaining the yaw angle of the light source based on the first yaw angle and the second yaw angle.

6. The method according to claim 5, wherein the obtaining orientation information of the light source relative to a target vehicle comprises:

obtaining the orientation information based on an illuminance value detected by an illuminance sensor disposed on the target vehicle.

7. An apparatus for controlling variable transmittance glass, comprising a processor and a memory, wherein the memory stores instructions, and when the instructions stored in the memory are invoked by the processor, the instructions are used to perform a method of controlling variable transmittance glass of a target vehicle, the method comprising:

obtaining an elevation angle and a yaw angle of a light source;

obtaining location information of a target object within the target vehicle;

obtaining a mapping area of the target object on the variable transmittance glass based on the location information of the target object, and the elevation angle and the yaw angle of the light source, including obtaining a mapping area of the target object on a vertical plane based on the location information of the target object, and the elevation angle and the yaw angle of the light source, wherein the vertical plane indicates a plane perpendicular to a plane on which a chassis of the target vehicle is located and that passes through and includes an upper edge of the variable transmittance glass; and obtaining the mapping area of the target object on the variable transmittance glass based on an included angle between the vertical plane and the variable transmittance glass and the mapping area of the target object on the vertical plane; and adjusting a transmittance of the mapping area of the target object on the variable transmittance glass.

8. A non-transitory computer-readable storage medium, comprising a program, wherein when the program is run on a computer, the computer is enabled to perform a method of controlling variable transmittance glass of a target vehicle, the method comprising:

obtaining an elevation angle and a yaw angle of a light source;

obtaining location information of a target object within the target vehicle;

obtaining a mapping area of the target object on the variable transmittance glass based on the location information of the target object, and the elevation angle and the yaw angle of the light source, including obtaining a mapping area of the target object on a vertical plane based on the location information of the target object, and the elevation angle and the yaw angle of the light source, wherein the vertical plane indicates a plane perpendicular to a plane on which a chassis of the target vehicle is located and that passes through and includes an upper edge of the variable transmittance glass; and obtaining the mapping area of the target object on the variable transmittance glass based on an included angle between the vertical plane and the variable transmittance glass and the mapping area of the target object on the vertical plane; and adjusting a transmittance of the mapping area of the target object on the variable transmittance glass.

* * * * *